(12) United States Patent
Derscheid et al.

(10) Patent No.: US 7,000,533 B2
(45) Date of Patent: Feb. 21, 2006

(54) BALE UNLOADING ARRANGEMENT OF A LARGE ROUND BALER

(75) Inventors: Daniel Eric Derscheid, Ottumwa, IA (US); Jean Viaud, Gray (FR)

(73) Assignee: Deere & Company, Moline, IL (US)

( * ) Notice: Subject to any disclaimer, the term of this patent is extended or adjusted under 35 U.S.C. 154(b) by 84 days.

(21) Appl. No.: 10/722,325

(22) Filed: Nov. 25, 2003

(65) Prior Publication Data

US 2004/0103632 A1 Jun. 3, 2004

(30) Foreign Application Priority Data

Nov. 26, 2002 (DE) ................................ 102 54 954

(51) Int. Cl.
*B30B 3/00* (2006.01)
*B30B 15/32* (2006.01)

(52) U.S. Cl. ............................... 100/87; 100/7; 100/88; 100/89; 100/100; 56/341

(58) Field of Classification Search .................... 100/5, 100/87, 88, 89, 100, 7; 56/88, 341, 350, 56/344, 345, 346; 414/246
See application file for complete search history.

(56) References Cited

U.S. PATENT DOCUMENTS 5,822,967 A 10/1998 Hood et al. .................... 56/341
6,240,712 B1 * 6/2001 Meijer ...................... 56/16.4 R
6,457,295 B1 * 10/2002 Arnold ......................... 53/211
6,807,901 B1 * 10/2004 Bentzinger et al. ........... 100/40

FOREIGN PATENT DOCUMENTS

| DE | 33 04 518 C2 | | 8/1983 |
| EP | 217715 A1 | * | 4/1987 |
| GB | 2292335 A | * | 2/1996 |

* cited by examiner

*Primary Examiner*—Derris H. Banks
*Assistant Examiner*—Jimmy T. Nguyen

(57) ABSTRACT

A bale unloading arrangement of a large round baler includes a bale take-up device mounted to a carrier which is in turn mounted to the axle of the baler for vertical pivoting movement beneath the baling chamber of the baler. A spring is mounted between the carrier and the axle for keeping the carrier in an elevated position until a completed bale is discharged onto the carrier. The carrier is shaped such that the bale take-up device, which is mounted for movement along the carrier, moves down the carrier to the rear and into a position for gently depositing the bale on the ground. The bale take-up device includes an upper bale-receiving structure that may be selectively pivoted about a fore-and-aft axis so as to deposit a bale on its end, and the carrier is mounted for being shifted sideways so that a bale deposited in this manner may be deposited outside the path traveled by the baler.

6 Claims, 4 Drawing Sheets

BALE UNLOADING ARRANGEMENT OF A LARGE ROUND BALER

FIELD OF THE INVENTION

The invention concerns a bale unloading arrangement of a large round baler with a carrier and a bale take-up device.

BACKGROUND OF THE INVENTION

Bale unloading arrangements known in the state of the art (DE 33 04 518 C2) consist of ramps that are attached to the frame or the axle of a large round baler, free to pivot vertically, and sink to the ground on the basis of the weight of a cylindrical bale that has been unloaded. A cylindrical bale deposited on it rolls downward. If necessary, springs prevent the ramps from being lowered too rapidly, in order to limit the rolling movement.

The problem underlying the invention is seen in the fact that the cylindrical bale can roll away uncontrolled, particularly on precipitous terrain.

SUMMARY OF THE INVENTION

According to the present invention, there is provided an improved bale unloading arrangement for a large round baler.

An object of the invention is to provide a bale unloading arrangement for receiving, and controlling the discharge of a bale from the baling chamber of a large round baler such that the bale is deposited onto the ground with no or very little rolling.

This object is achieved by providing an unloading arrangement including a carrier that is movable in height and that can approach the ground under control or on the basis of gravity and take the bale from the bale take-up device by tilting or the like. The carrier may be configured as a one-armed component or have multiple arms and can be repositioned in height by pivoting, parallelogram action or in linear motion. The bale take-up device can roll on the carrier, be shifted or be pivoted on it. In each case, the bale is prevented from rolling down a ramp and continuing to roll due to its kinetic energy, for example, down an incline.

The technically simplest way to move the carrier in the vertical direction consists in utilizing its own pivoting. This is controlled by means of outside force so that the weight of the cylindrical bale does not perform the unloading process without external control.

A horizontal movement of the carrier has the advantage that the cylindrical bale can be deposited not only behind but also to the side of the large round baler. A further advantage lies in the fact that the cylindrical bale can thereby be moved rapidly out of the path of movement of an outlet flap or discharge gate and that the latter can be lowered immediately after the departure of the cylindrical bale. The horizontal movement can be performed by means of a pivoting movement as well as by a translational movement.

The support in bearings of the bale take-up device by means of rolling bodies has the advantage that this can move solely on the basis of the force of gravity with corresponding inclination between its end positions, which would be more difficult, for example, with sliding contact bearings. The rolling contact bodies may be pulleys, wheels, etc. A guide is preferably provided for the rolling bodies in, at or on the carrier or on several carriers.

A controlled movement of the bale take-up device has several advantages. For example, the cylindrical bale can be moved rapidly and safely out of the region of movement of an outlet or discharge gate. Furthermore, there is assurance that the bale take-up device is in its take-up position, even when forces counteract this, due to the inclination of the ground that would otherwise prevent an automatic movement of the bale take-up device. Moreover, the bale depositing movement can be performed slowly, and hence gently, without generating inertia forces.

The cylindrical bale can be deposited on the ground in the same form as it was accepted from the baling chamber; however, its longitudinal centerline can be pivoted through 90° in the horizontal plane; finally, it can be deposited to the side on its end face, which can reliably prevent a rolling-away movement.

The weight of the cylindrical bale can be determined easily, when it alone rests on the bale take-up device or is tilted over its edge. The peak load measured during the latter condition is a reliable measure of the weight.

The use of sensors for the bale take-up device makes it possible to detect whether the bale take-up device is in a position to accept a bale in the first place and/or whether the cylindrical bale was actually deposited on the ground. For this purpose, mechanical movement sensors, as well as, non-contact sensors can also be used.

The movement of the bale take-up device can then be performed by a remotely located stepper motor that is favorably accommodated, whose actuating force is transmitted by means of a rope pull, chains, rods, steering arms, and the like.

Besides an active movement of the bale take-up device, the unloading of the cylindrical bale can also be performed by the carrier guiding the bale take-up device in a predetermined path, for example, a path inclined to the side or a path tilting over the end at the point of deposit.

If the carrier is provided with at least one rail, a massive support for the cylindrical bale is guaranteed, while two rails offer an even safer guidance for the bale take-up device. A telescoping arrangement can, on the one hand, lead to a shorter configuration, and on the other hand, to a deposit of the cylindrical bale far away from the unloading opening.

The necessity of returning the take-up device to the take-up position, after the unloading process, can be omitted if the device is configured as a circulating bar-chain conveyor that is provided, for example, with a chain guided in, on or by two rails between which bars extend that carry the cylindrical bale. These bars can move, with the upper span from the baling chamber to the deposit location, independently on the basis of the force of gravity or be driven, and thereby carry along the cylindrical bale.

BRIEF DESCRIPTION OF THE DRAWINGS

The drawing reveals an embodiment of the invention that shall be described in greater detail in the following.

DESCRIPTION OF THE PREFERRED EMBODIMENT

Figure 1:
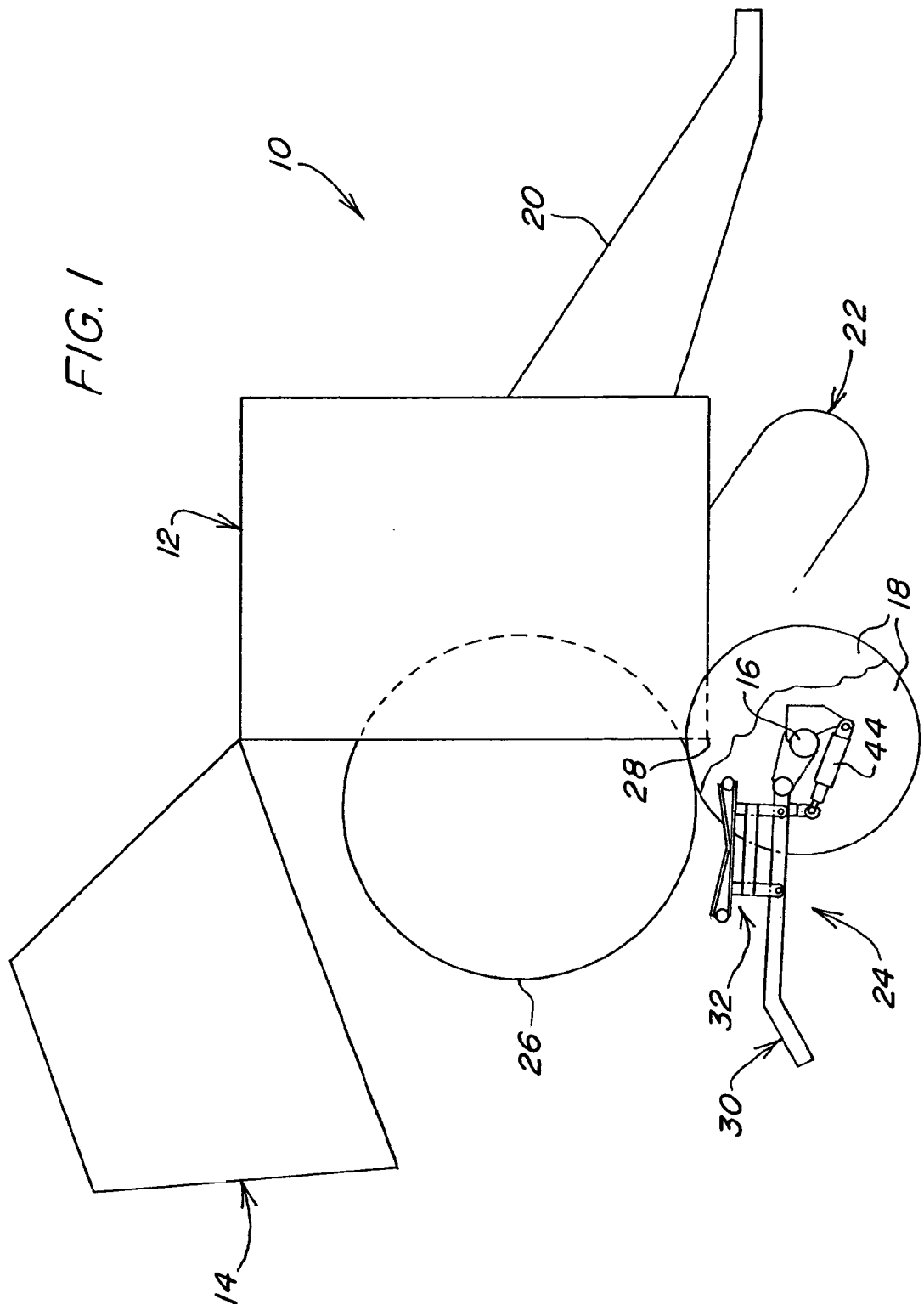
FIG. 1 is a schematic side view of a large round baler equipped with a bale unloading arrangement, according to the invention, in a take-up situation.
Figure 2:
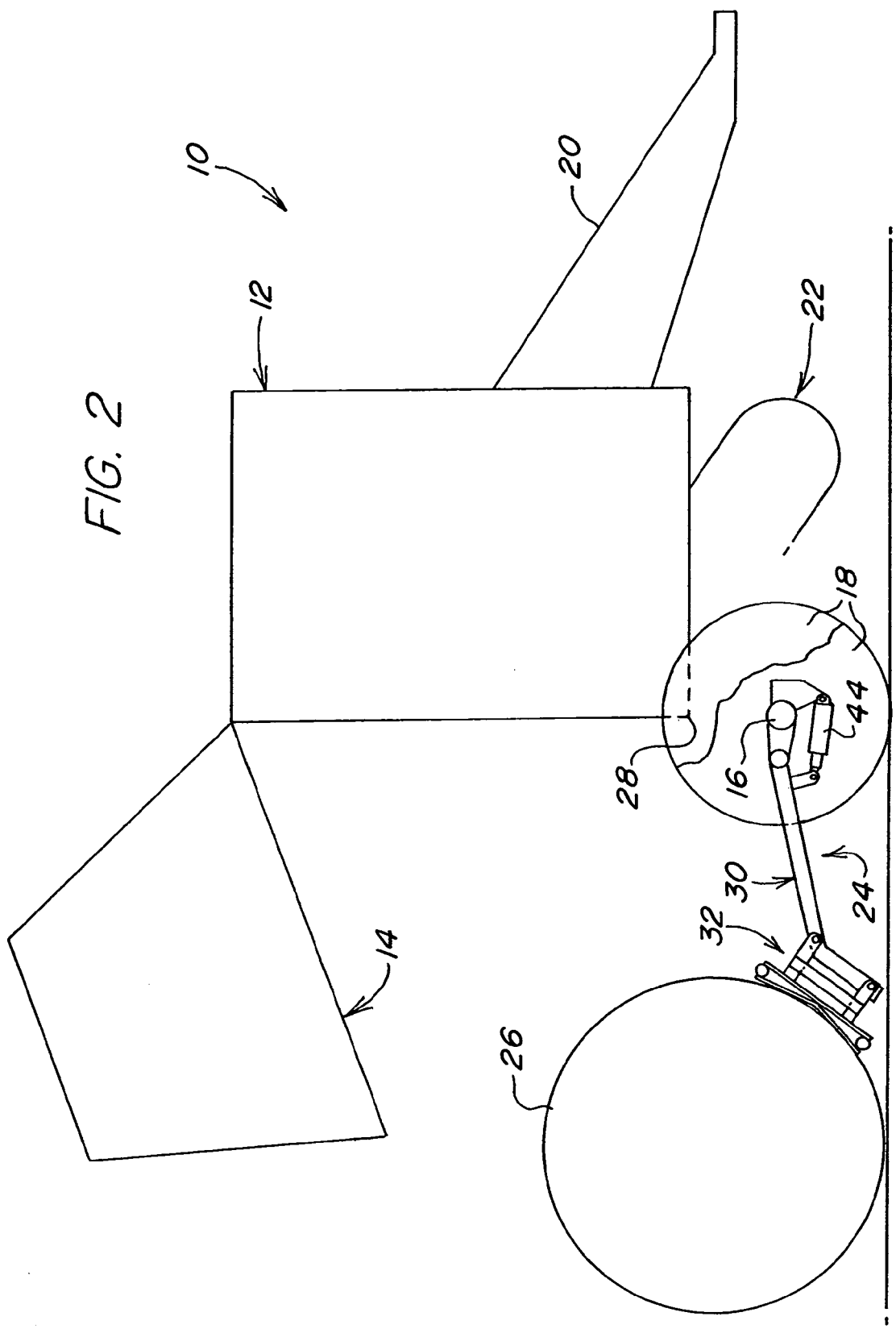
FIG. 2 is a view of the large round baler of FIG. 1 with the bale unloading arrangement in an unloading situation.

Referring now to FIGS. 1 and 2, there is shown a large round baler 10 that is provided with a forward baler housing 12, and a discharge gate 14 defining a rear housing mounted to an upper rear location of the forward housing 12 for pivoting vertically between a lowered baling condition (not shown), wherein it cooperates with the forward baler housing 12 to define opposite sides of a baling chamber and a raised bale discharge condition, as illustrated. The forward baler housing 12 is carried by a chassis including an axle 16 with wheels 18 at its opposite ends, and a towbar 20 is fixed to the housing 12 and has a forward end adapted for attachment to an agricultural tractor, not shown, for moving the baler across the ground. A crop take-up arrangement 22 is mounted to the chassis for taking crop up and conveying it into the baling chamber, and a bale unloading arrangement 24 is mounted to the axle for receiving a completed bale 26 and depositing it on the ground. With the towbar 20 coupled to a towing vehicle, tilting of the baler 10 about the axle 16 is prevented during rearward movement of the bale 26.

The large round baler 10 is shown in very simplified form, since it depends on the configuration, function, and details of the structure illustrated, only in so far as they are described in the following, while the remainder can be configured in multitudinous and known ways. Otherwise, the essential object is that the cylindrical bale 26 formed in the large round baler 10 be deposited gently on the ground, so that the primary object of concern is directed at the bale unloading arrangement 24, that can be attached subsequently to existing large round balers 10 of the most varied configurations.

When the discharge gate 14 is raised, the forward baler housing 12 opens to the rear and forms a lower rear edge 28 slightly above the axle 16 over which the cylindrical bale 26 rolls to the rear out of the baling chamber, not described in any further detail.

The discharge gate 14 can be pivoted vertically between a lower closed position, wherein it cooperates with the forward housing to define opposite side walls of a baling chamber, and a raised discharge position, wherein it opens a rear portion of the baling chamber, so that the cylindrical bale 26 can escape to the rear. In the lowered position, not shown, a bottom wall of the discharge gate is located slightly above the bale unloading arrangement 24. Also, the opposite side walls of the forward housing 12 and the discharge gate 14 are located inboard of the opposite wheels 18.

The bale unloading arrangement 24 includes a carrier 30 and a bale take-up or receiving device 32 and is used to deposit a cylindrical bale 26 on the ground or to set it on the ground without imparting a significant rolling movement to it. Accordingly, the bale unloading arrangement 24 is located immediately following the rear edge 28 and underneath the discharge gate 14 in a position that permits taking up or receiving a cylindrical bale 26.

Figure 3:
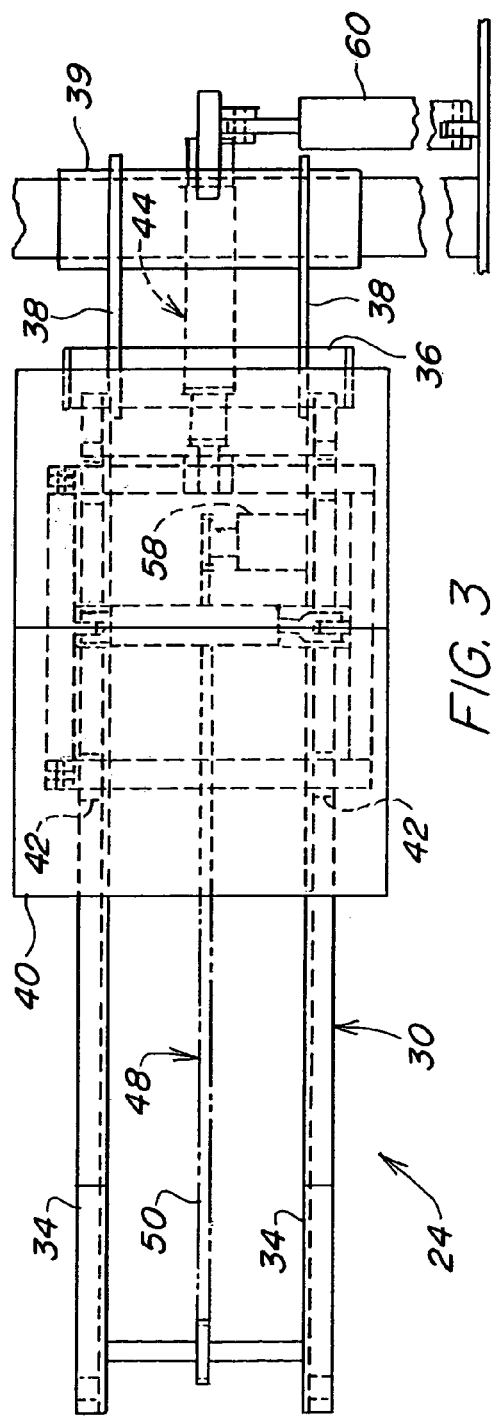
FIG. 3 is a top plan view of the bale unloading arrangement.
Figure 4:
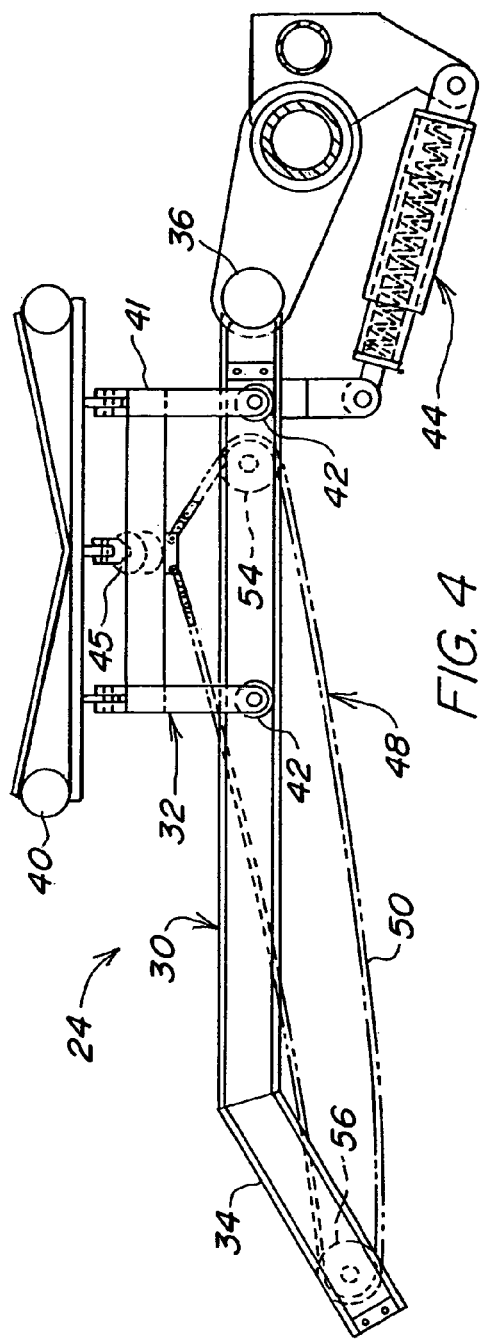
FIG. 4 is a right side view of the bale unloading arrangement of FIG. 3.

Referring now also to FIGS. 3 and 4, it can be seen that in this embodiment, the carrier 30 includes two rails 34 and a transverse support member 36 that are rigidly connected to each other, although if necessary, can be released from each other, and can pivot together.

The rails 34 are configured as U-shaped rails whose interior opens horizontally to the outside. Beginning from the front, that is, from the right in FIGS. 3 and 4, the rails 34 extend in a straight line over approximately five-sixth of their entire length, while the last sixth is inclined downward and to the rear at an angle of approximately 45° towards the ground. The rails 34 extend parallel to each other, and when in a raised, non-operating position, as shown in FIG. 1, are disposed such that their straight forward sections are relatively parallel to the ground.

It should be noted that more or fewer than two rails 34 could be used and that the interior could also be opened to the inside and/or that the rails 34 could be provided with a different profile or a different cross section as long as a sliding or rolling movement of the bale take-up device 32 on them is possible. Beyond that, the rails 34 could also be configured in a telescoping arrangement.

The carrier 30 includes a transverse support member 36 which extends parallel to the axle 16 and is connected to the axle 16 by means of straps 38 joined to a bearing sleeve 39 received on the axle, so as to pivot vertically about, and so as to slide along the axle 16. For the sake of simplicity, the sleeve 39 is here shown as a one-piece member, and the sleeve 39 would more likely be made in two parts which are clamped together about the axle 16 with bolts, in a manner well known in the art. Preferably, the support member 36 is configured as a tube with a circular cross section. Therefore, the transverse support member 36 is used to connect to the rails 34 and thereby the bale unloading arrangement 24, to pivot freely on the large round baler 10. In differing embodiments, the transverse support member 36 could be omitted and the rails 34 could be attached directly to the axle 16 so as to pivot vertically. The rails 34 could be pivotally attached directly to the baler housing 12, but in such a case transverse movement of the bale take-up device would have to be accomplished by another structure.

The bale take-up device 32 is configured essentially as a slide or a carriage that is guided on, in or at the carrier 30, so as to move freely. For this purpose, the bale take-up device 32 is provided with a bale-receiving member 40 mounted to a carriage frame 41 including rolling bodies or elements 42.

Figure 5:
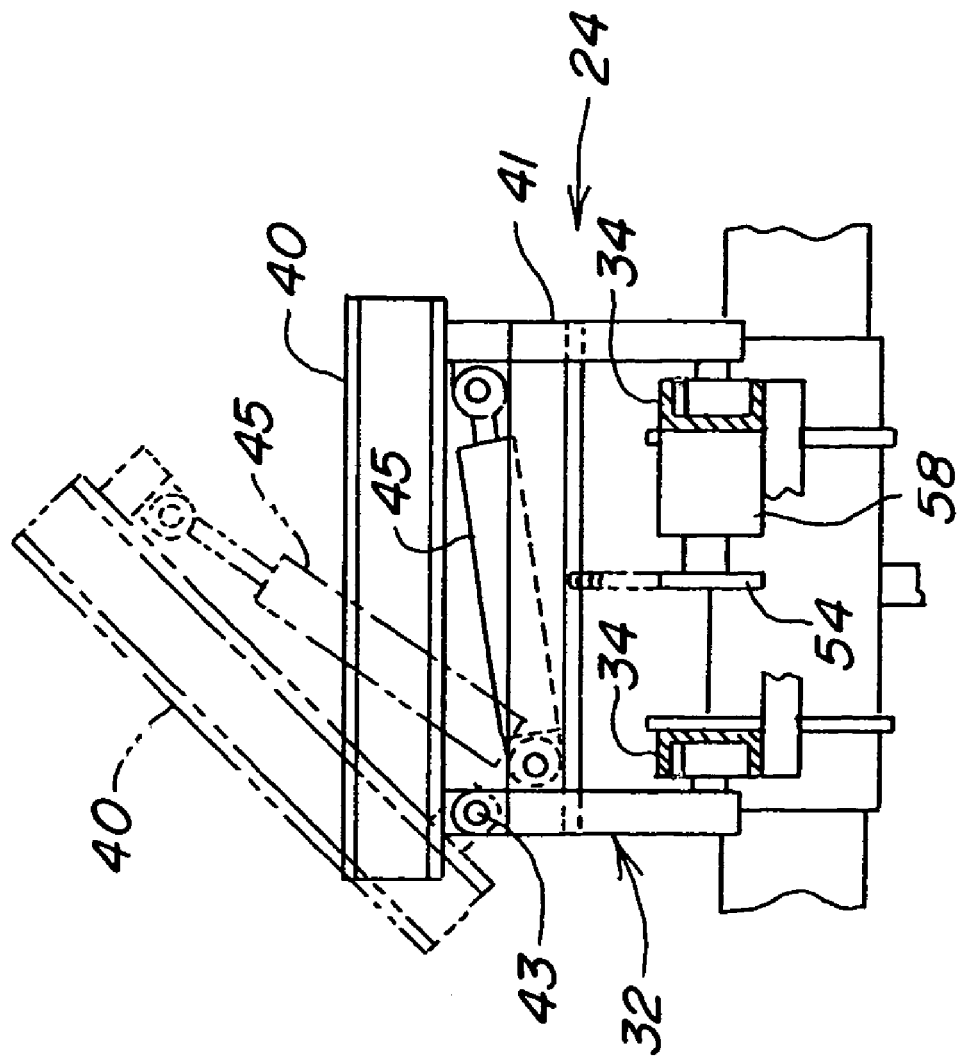
FIG. 5 is a rear view of the bale take-up device showing, in broken lines, a condition for depositing a bale on its end.

The bale-receiving member 40 is configured sufficiently large so that it can safely accept a cylindrical bale 26 and is shaped so as to define a trough, oriented transverse to the direction of movement of the bale take-up device 32 that prevents the cylindrical bale 26 from rolling off. Referring now also to FIG. 5, it can be seen that the bale-receiving member 40 is mounted to the left-hand side of the carriage frame 41 for pivoting vertically about a fore-and-aft axis defined by a fore-and-aft extending pivot pin 43 between a lowered bale-receiving position, and a raised bale-depositing position. An extensible and retractable powered tilt device 45, here shown as a hydraulic actuator, is connected between the carriage frame 41 and the bale-receiving member 40 for moving the latter between its bale-receiving and bale-depositing positions. The actuator 45 may be hydraulically or electrically powered, for example.

The rolling bodies 42 are retained on the carriage frame 41 at the underside of the bale-receiving member 40, free to rotate, for example, in yokes, rails or in other retaining devices, not described in any further detail, and are inserted into the interior of the rails 34 in which they are movable. In the assembled condition, therefore, the carriage frame 41, and hence, the bale-receiving member 40 can be moved along the rails 34 without any danger of loss.

In place of a bale take-up device 32 that can move back and forth in the manner of a slide, a circulating, driven or not driven bar-chain conveyor could also be used.

A control arrangement 44 is provided for controlling the vertical movement of the bale unloading arrangement 24. In its simplest form, and that used here, it is configured as a compression spring that operates between the carrier 30, particularly its rails 34, and the large round baler 10, particularly an arm carried by the bearing sleeve 39 received on its axle 16, and forces the carrier 30 upward constantly. This control arrangement operates as follows: The bale unloading arrangement 24 is forced upward by the control arrangement 44 and takes up the cylindrical bale 26 that is rolling over the rear edge 28 so that it settles in the trough defined by the bale-receiving member 40. As soon as the discharge gate 14 is opened far enough that the weight of the cylindrical bale 26 can operate upon the bale unloading arrangement 24 without any hindrance, the carrier 30 with the bale take-up device 32 will pivot downward about the axle 16 against the force of the control arrangement 44. On the basis of the inclination of the carrier 30 then existing, the bale take-up device 32 will then roll to the rear and thereby transport the cylindrical bale 26 in a resting condition. Finally, the end region of the rails 34, that is angled downward, will touch the ground and tilt the bale take-up device 32 which leads to the deposit of the cylindrical bale 26, as shown in FIG. 2. Since in this position the bale take-up device 32 is located immediately above the ground, the cylindrical bale 26 is merely set down or deposited instead of being rolled down. As a result, the cylindrical bale 26 remains lying on the ground and neither rolls down an inclined surface, nor does yarn wrapped around it unravel.

In addition to gravity working to move the take-up device 32 down the rails 34 once the latter begin to lower against the action of the control arrangement 44 under the weight of the bale 26, a take-up drive arrangement 48 is provided for moving the take-up device 32 under power. Specifically, the drive arrangement 48 includes a length of roller chain 50 having opposite ends coupled to the carriage frame 41, as at 52, being trained over front and rear chain sprockets 54 and 56, respectively mounted on respective shafts extending between, and mounted to, front and rear regions of the guide rails 34. A reversible take-up drive device 58, here shown as a motor, which may be either a hydraulic motor of an electric motor, for example, is coupled for driving the front chain sprocket 52. Thus, powering the motor 56 in a first direction results in the chain 50 pulling the take-up device 32 to its rearmost position for depositing a bale on the ground, and powering the motor 56 in an opposite direction returns the take-up device 32 to its forward standby or non-operating, wherein it is positioned for receiving a finished bale. Appropriate sensors and controls may be provided for automatically stopping operation of the motor 58 when the take-up device 32 reaches its extreme forward and rearward end positions, or any desired intermediate position.

Instead of depositing the bale 26 on the ground at the rear of the rails 34, it may be desired to deposit the bale 26 to the side of the baler 10. This is accomplished by providing an extensible and retractable powered shift device 60, shown here as a hydraulic actuator, coupled between the baler frame and the bearing sleeve 39 coupling the bale unloading arrangement 24 to the axle 16, and selectively operable for moving the arrangement 24 along the axle 16 towards the left wheel 18. Once the arrangement 24 is in its shifted position, the carriage drive motor 58 is actuated to move the bale rearward far enough to clear the adjacent wheel 18. The actuator 45 is then actuated to tilt the bale-receiving member 40 about the fore-and-aft axis established by the pin 43. Tilting of the bale-receiving member 40 will result in the bale 26 sliding off the bale-receiving member 40 and landing so as to settle on its left-hand end out of the path of the baler 10. As soon as the bale 26 is placed on its end, the discharge gate 14 may be closed since the bale 26 will then be positioned free of the path of the closing gate 14.

Other control arrangements can affect the position of the carrier 30 as well as that of the bale take-up device 32 and be configured in particular as motor-driven and/or dependent upon the position of the discharge gate 14.

Having described the preferred embodiment, it will become apparent that various modifications can be made without departing from the scope of the invention as defined in the accompanying claims.

What is claimed is:

1. In a large round baler supported on wheels carried at opposite ends of a horizontal, transverse axle fixed to a frame of the baler, and including a baling chamber having opposite side walls defined in part by a bale discharge gate movable between a lowered baling position and a raised bale discharge position defining an outlet through which a bale may fall to the ground, a longitudinally extending bale unloading arrangement mounted to the baler for pivoting vertically between a raised bale-receiving position and a lowered, bale-depositing position, with movement from said bale-receiving position to said bale-depositing position being against an upwardly directed biasing force, the improvement comprising: said bale unloading arrangement including a carrier attached to said large round baler so as to move vertically; and a bale take-up device including a trough-shaped bale-receiving member and being mounted to said carrier for being guided between a forward position, wherein said bale-receiving member is located adjacent a forward end of said carrier, and below, and facing said outlet of said baling chamber when said discharge gate is in said raised bale discharge position, and a rearward position located adjacent a rear end of said carrier and facing away from said outlet when said bale unloading arrangement is in said bale-depositing position.

2. The large round baler, as defined in claim 1, wherein said carrier has said forward end attached to said axle, so as to pivot vertically; and said biasing force being supplied by a compression spring.

3. The large round baler, as defined in claim 1, wherein said carrier includes a longitudinal guide rail assembly having a straight major section joined to a downwardly and rearwardly angled minor section; said major section being substantially parallel to the ground when said bale unloading arrangement is in said bale-receiving position; and said take-up device including front and rear rotatable assemblies mounted for movement along said guide rail assembly such that when at least said front rotatable assembly descends said minor section of said guide rail assembly said bale-receiving member will face upwardly to the rear.

4. The large round baler, as defined in claim 1, wherein a powered, reversible bale take-up drive is coupled between said bale take-up device and said carrier for moving said bale take-up device fore-and-aft along said carrier.

5. In a large round baler supported on wheels carried at opposite ends of a horizontal, transverse axle fixed to a frame of the baler, and including a baling chamber having opposite side walls defined in part by a bale discharge gate movable between a lowered baling position and a raised bale discharge position defining an outlet through which a bale may fall to the ground, a longitudinally extending bale unloading arrangement mounted to the baler for pivoting vertically between a raised bale-receiving position and a lowered, bale-depositing position, with movement from said bale-receiving position to said bale-depositing position being against an upwardly directed biasing force, the improvement comprising: said bale unloading arrangement including a carrier attached to said large round baler so as to move vertically; and a bale take-up device including a trough-shaped bale-receiving member and being mounted to said carrier for being guided between a forward position, wherein said bale-receiving member is located below, and facing said outlet of said baling chamber when said discharge gate is in said raised bale discharge position, and a rearward position facing away from said outlet when said bale unloading arrangement is in said bale-depositing position; said bale take-up device including a carriage frame and said bale-receiving member mounted to said carriage frame for pivoting vertically about a fore-and-aft extending axis between a bale-receiving position and a bale-depositing position; and a powered tilt device being coupled between said carriage frame and said bale-receiving member for selectively moving said bale-receiving member between said bale-receiving and bale-depositing positions, whereby a bale carried by said bale-receiving member may be deposited on its end.

6. The large round baler, as defined in claim 1, wherein said carrier is mounted to said baler for transverse shifting movement; and a powered shift device being coupled between said baler and said carrier for selectively shifting the latter transversely to an unloading position adjacent one side of said baler, whereby a bale may be deposited on its end at a location outside a path traveled by the baler once the carrier is shifted to said unloading position.

* * * * *